Feb. 10, 1970 HIROSHI SUGAYA 3,494,026

METHODS FOR MANUFACTURING MAGNETIC HEADS

Original Filed Aug. 12, 1963 3 Sheets-Sheet 1

Inventor
Hiroshi Sugaya
By Stevens, Davis, Miller & Mosher
Attorneys

METHODS FOR MANUFACTURING MAGNETIC HEADS

Original Filed Aug. 12, 1963 3 Sheets-Sheet 2

Inventor
Hiroshi Sugaya
By Stevens, Davis, Miller & Mosher
Attorneys

METHODS FOR MANUFACTURING MAGNETIC HEADS

Original Filed Aug. 12, 1963 3 Sheets-Sheet 3

INVENTOR.
Hiroshi Sugaya
BY
Stevens, Davis, Miller & Mosher
Attorneys

United States Patent Office 3,494,026
Patented Feb. 10, 1970

3,494,026

METHODS FOR MANUFACTURING MAGNETIC HEADS

Hiroshi Sugaya, Ashiya-shi, Japan, assignor to Matsushita Electric Industrial Co., Ltd., Kadoma, Kadomacho, Kitakawachi-gun, Osaka, Japan, a corporation of Japan Continuation of abandoned application Ser. No. 301,335, Aug. 12, 1963. This application June 23, 1967, Ser. No. 648,504
Claims priority, application Japan, Aug. 13, 1962, 37/34,812; Aug. 16, 1962, 37/35,525; Oct. 30, 1962, 37/64,815; Dec. 13, 1962, 37/76,417
Int. Cl. G11b *5/42;* H01f *7/06*
U.S. Cl. 29—603 4 Claims

ABSTRACT OF THE DISCLOSURE

A method for manufacturing a magnetic head by the steps of interposing a spacer element of predetermined thickness, of capillary dimensions, and equal to the desired magnetic gap at each opposite end of two opposing magnetic cores. The cores are formed of hard and brittle magnetic material and have a length larger than a predetermined track width. A mixture of two kinds of non-magnetic, nonelectroconductive materials of different physical characteristics from each other are placed in the gap between the magnetic heads and the article is heated to cause the mixture to infiltrate into the gap, by capillary action to provide a bond between the cores and materials.

The present application is a continuation of my copending application Ser. No. 301,335, filed Aug. 12, 1963, now abandoned.

The present invention generally relates to magnetic heads for recording and reproducing, and more particularly to structures of and methods for manufacturing the magnetic heads wherein jig spacers of glass materials are used.

Magnetic heads for recording and reproducing having cores of a ceramic material of iron oxide series such as ferrite are appreciated owing to little eddy current loss and strong resistance against wear, and now find application thereof in the field of recording and reproducing video signals. Heretofore, widely accepted practices in manufacturing the magnetic heads having the cores of ceramic materials have included interposition of spacers of a predetermined thickness into opposing faces of ceramic material so that the spacers are held between the opposing faces of the magnetic cores. It has been considered most preferable to use spacers of glass material when ferrite is used as magnetic cores, and these methods have been known from about ten years ago. According to one of the known methods for manufacturing the glass spacers, a glass foil several percent thicker than a predetermined thickness is interposed between opposing faces of magnetic cores and heated until it is softened to thereby bond the softened glass to the ferrite cores. However, such method has been defective in that it is difficult to manufacture and to obtain a high degree of precision.

With such defects of prior methods in view, the primary object of the invention is to provide a new and improved method for manufacturing a magnetic head.

Another object of the invention is to provide a method for manufacturing a magnetic head comprising disposing a hard and brittle magnetic material at least at a portion abutting a recording medium and forming a magnetic gap, and then infiltrating a non-magnetic material in a molten state into the magnetic gap so formed by means of a capillary action to thereby fill up said extremely narrow magnetic gap wtih said non-magnetic material.

Still another object of the invention is to provide a method for manufacturing a magnetic head comprising disposing a hard and brittle magnetic material at least at a portion abutting a recording medium and forming a magnetic gap, and then infiltrating a glassy material in a molten state into the magnetic gap so formed by means of a capillary action to thereby fill up said extremely narrow magnetic gap with said non-magnetic glassy material.

Yet another object of the invention is to provide a method for manufacturing a magnetic head comprising disposing a hard and brittle magnetic material at least at a portion abutting a recording medium and forming a magnetic gap, and then infiltrating under heating a mixture of a glassy material having a low melting point and a high fluidity and a hard vitreous material having a thermal expansion coefficient analogous to the magnetic cores into the magnetic gap so formed by means of a capillary action to thereby fill up said extremely narrow magnetic gap with said non-magnetic glassy material.

Further another object of the invention is to provide a method for manufacturing a magnetic head comprising disposing a hard and brittle material at least at a portion abutting a recording medium and forming a magnetic gap, and then infiltrating a glassy material in a molten state intermixed with powder of a hard non-magnetic material into the magnetic gap so formed by means of a capillary action to thereby fill up said extremely narrow magnetic gap with said non-magnetic glassy material.

A further object of the invention is to provide a method for manufacturing a magnetic head comprising disposing a hard and brittle magnetic material at least at a portion abutting a recording medium and forming a magnetic gap, and then infiltrating a non-magnetic material in a molten state into a junction between the magnetic cores and a non-magnetic spacer by means of a capillary action to thereby fill up said magnetic gap with said non-magnetic material, said non-magnetic material being highly permeable, rich in fluidity and effective to provide good bond with the spacer material and the core material.

A still further object of the invention is to provide a method for manufacturing a magnetic head comprising disposing a hard and brittle magnetic material at least at a portion abutting a recording medium and forming a magnetic gap, and then infiltrating an organic material in a molten state into the magnetic gap so formed by means of a capillary action to thereby fill up said extremely narrow magnetic gap with said non-magnetic material.

A yet further object of the invention is to provide a method for manufacturing a magnetic head comprising disposing a hard and brittle magnetic material at least at a portion abutting a recording medium and forming a magnetic gap, inserting a thin distance piece in each end of the magnetic gap preformed to have a greater length than a track width of said head, and then infiltrating a non-magnetic material in a molten state into the magnetic gap so formed by means of a capillary action to fill up said extremely narrow magnetic gap with said non-magnetic material.

Another object of the invention is to provide a method for manufacturing a magnetic head comprising disposing a magnetic ceramic material shaped at a high temperature and a high pressure at least at a portion abutting a recording medium and forming a magnetic gap, and then infiltrating a non-magnetic material in a molten state into the magnetic gap so formed by means of a capillary action to thereby fill up said extremely narrow magnetic gap with said non-magnetic material.

There are other objects and particularities of the invention which will become obvious from the following description with reference to accompanying drawings showing preferred embodiments of the invention, in which.

Figure 4:
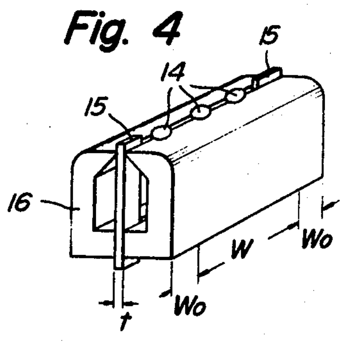
FIG. 4 is a perspective view showing an embodiment of a method for manufacturing a magnetic head according to the invention.

FIG. 4 and the succeeding drawings show preferred embodiments of methods for manufacturing the magnetic heads wherein aforementioned non-magnetic glassy, materials are used to form spacers for the magnetic heads.

With regard to the conventional methods, general outline thereof has been described in the foregoing, but further detailed explanation of such conventional methods will greatly assist in the better understanding of the methods according to the invention which will be explained in more details in the later description.

Figure 1:
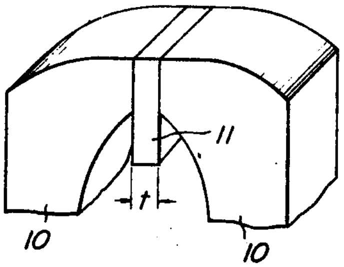
FIG. 1 is a fragmentary perspective view showing the structure of opposing portions of magnetic cores in a conventional magnetic head.
Figure 2:
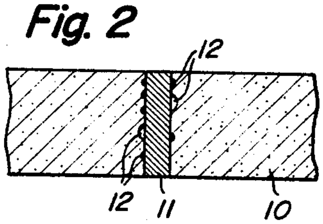
FIG. 2 is a top plan view of the magnetic head shown in FIG. 1.
Figure 3:
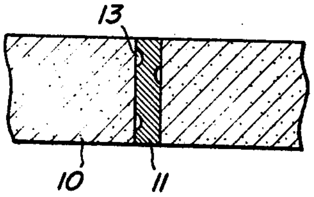
FIG. 3 is a view similar to FIG. 2, but showing the head in another state.

Hereinunder, description will first be directed to a few typical examples of the conventional methods with reference to FIGS. 1–3.

A spacer for a magnetic head and the structure thereof most widely employed heretofore are as shown in FIG. 1, wherein the spacer 11 of a predetermined thickness is inserted in a magnetic gap formed by opposing faces of cores 10 of soft magnetic material and held in the gap by means of mechanical friction. The soft magnetic material used therefor includes permalloy (Fe 22% and Ni 78%) and molybdenum permalloy (Fe 16.5%, Ni 78.5% and Mo 5%). The spacer is made of a non-magnetic metal such as copper or beryllium copper, which is formed as a thin foil of a predetermined thickness *t* and interposed between the cores 10 as shown in FIG. 1. In some cases, a bonding agent may be applied between the cores 10 and the spacer 11, but generally the structure is such that the magnetic cores 10 are mechanically coupled together with the spacer 11 held therebetween by means of friction. At present, this structure is generally widely used in magnetic heads for audio frequency recording.

As frequencies of signals to be recorded by the magnetic head become higher until finally video signals are to be recorded by the magnetic head having the cores of magnetic metallic material, an increased eddy current loss will result. In this case, a magnetic material of iron oxide such as ferrite or a combination of a magnetic metallic material and a magnetic material of iron oxide is generally used. Considering the eddy current loss and magnetic resistance at high frequency, it is desirable that the magnetic head is made of such iron oxide magnetic material alone. However, with the magnetic cores of a material such as ferrite and the spacer, for example, of beryllium copper, cavities 12 are generally formed in the magnetic cores 10 at the portion of magnetic gap as shown in FIG. 2 and remarkably degrade the performance of the head. Since the ceramic material such as ferrite has an extremely high hardness, but is brittle, sharp edges of the magnetic gap are liable to be chipped away by the uneven surface of a magnetic tape, resulting in the formation of cavities 12 at the magnetic gap of the cores 10. These cavities are a fatal defect for the magnetic head in that they not only enlarge the effective length of the magnetic gap, but also blunt the abrupt rise in the distribution of magnetic flux density.

In order to eliminate such cavities, it is preferable to use a glass spacer and to bring the glass spacer into close contact with the ferrite cores. The use of the glass spacer is described comparatively in detail in a discussion by R. Cruel disclosed at pages 60–65 of "Nord West Deutsch Rundfunkt, vol. 5, 1953." Further, a method for manufacturing a magnetic head using a glass spacer is also disclosed in Japanese patent registration No. 293,528.

According to the method disclosed in said patent, a glass foil having a thickness several percent thicker than a predetermined gap width is interposed between opposing faces of two magnetic paths, and the entirety of the magnetic cores and the glass spacer is heated up to a softening temperature of glass, while forcing the magnetic path portions towards each other so that the gap width corresponding with the predetermined dimension can be obtained after the solidification of glass. For this purpose, besides the glass foil, mica distance pieces of a thickness as close to the required gap width as possible are interposed between the opposing faces of the magnetic path portions.

According to this method, however, it is necessary to prepare a glass foil of a thickness several percent thicker than the required gap width. Actually, a glass foil of a thickness of 1 to 2 $\mu$m is required, but it is extremely difficult to make such a foil. Manufacture of such foils in a factory is extremely inappropriate and a lot of cost will be involved therein, since the manufacturing process will involve inflating softened glass into a shape of a balloon to form glass foils, measuring the glass foils one and finding out the foils suitable for spacers of a predetermined thickness. Further, in the case of forming the glass spacer of the predetermined gap width by compressing it at the softening temperature, it is extremely difficult to determine that the glass spacer fits the mica gauge or not. In some cases, the glass spacer may be compressed more than required, resulting in the breakage of the magnetic cores. In other cases, pressure may be insufficient and a gap of a greater width than the predetermined one may be formed. In the case of a magnetic head used in a device for recording video signals, the gap width must be in the order of 2.0 to 2.2 $\mu$m. Therefore, it is apparent that an extremely poor rate of yield is obtained.

Mica is generally used as a gauge because a metal may react with glass or ferrite at an elevated temperature. However, no serious problem will arise when a metal such as titanium or nickel is used at a temperature below 900° C.

Further, in the method wherein the glass foil is interposed between the opposing portions of the both magnetic paths, and glass is made to adhere to the opposing portions of the cores at the softening temperature of glass by applying heat thereto, layers of air are frequently confined between the opposing portions of the both magnetic paths and the glass foil, and the glass is softened to be bonded to the opposing portions of the cores with the air confined therein. Therefore, in many cases, the air finds no way out for escape and remains in the form of bubbles 13 between the opposing portions of the cores 10 and the glass foil 11 as shown in FIG. 3.

This invention obviates the defects in the structure and manufacturing process of the prior methods, and provides an easy and stable manner of forming the magnetic gap at an extremely high precision. The technical content of the invention will now be described with reference to preferred embodiments thereof.

In FIG. 4 showing an embodiment of the invention, distance pieces 15 of a thickness *t* are interposed at least at two positions between opposing portions (magnetic gap portion) of ceramic cores 16 forming magnetic paths in order that a predetermined gap width *t* can thereby be maintained. The ceramic cores 16 have been preformed to have a length which is slightly longer than the track width W of the magnetic head. The distance pieces 15 are made of a material which can sufficiently withstand a melting temperature of glass. Mica is one of such materials, but it is difficult to obtain foils of the same thickness at all times. Therefore, metal foils such as of titanium or nickel may be used to provide an equally good effort. The metal such as titanium or nickel can readily be rolled into foils of a thickness in the order of $1\mu$.

Figure 5:
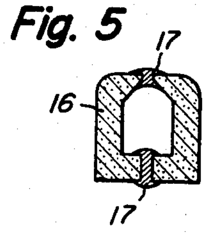
FIG. 5 is a vertical sectional view showing the magnetic head of FIG. 4 in a condition that a glassy material for spacers in a molten state infiltrates into void gaps by means of a capillary action.

Glass material 14 having the same coefficient of expansion as the cores 16 need not be rolled into a thin foil, and any of such glass material in the form of granule, rod, plate or powder may merely be piled up at spaced apart relationship on the predetermined gap formed between the opposing portions of the cores. In this case, there are such opposing portions at two places, and it is necessary that the glass material is placed on both of them. Then, the entirety of the cores with the glass material placed thereon is heated up to the melting point of the glass material 14. The glass material 14 is thereby melted into a fluid 17 as shown in FIG. 5 and infiltrates into the predetermined gap between the opposing portions of the cores by means of a capillary action. The glass material held in the gap in the fluid state is cooled and left to solidify, and the distance pieces 15 inserted to occupy portions W*o* are removed from the gap. Thus, the magnetic head having the predetermined track width W can be obtained. Several heads may simultaneously be made from a block of FIG. 4 when the block is so selected as to have a track width W an integral number of times as long as a track width of a magnetic head actually used. Further, the process of infiltration of the glass material into the opposing portions of the cores may be divided into more than two steps. Since the distance pieces 15 are completely removed from the head at the completion of the head, the distance pieces may be made of a material which may partially react with the glass material 14 or material of the cores 16, provided that such reaction would not spread over the entire core.

From the foregoing, it will be known that, according to the method, the molten vitreous material gradually infiltrates into the gap of the cores from one side, and air in the gap will accordingly be forced outwardly without forming any bubbles within the spacer. Further, the molten vitreous material may infiltrate into grains of the ceramic cores adjacent the gap faces, and thus improve the strength of the ceramic cores, which will sufficiently withstand the development of ruptures or cracks.

Figure 6:
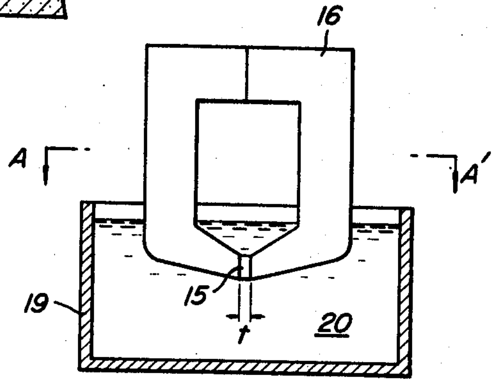
FIG. 6 is an explanatory view showing another embodiment of the method for manufacturing a magnetic head according to the invention.
Figure 7:
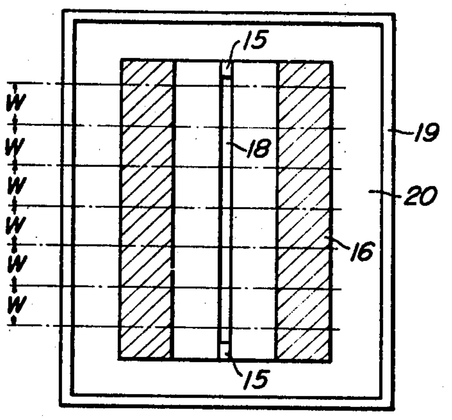
FIG. 7 is a section taken along line A—A' of FIG. 6.

Another embodiment of the invention is shown in FIGS. 6 and 7. According to this embodiment, a distance piece 15 is interposed between opposing faces 18 at each end of the cores 16 to maintain a predetermined gap width *t* as in the case of the previous embodiment. The cores 16, under this condition, are dipped in a liquid 20 of molten glass (having a composition, for example, of PbO 80%, $B_2O_2$ 16% and ZnO 4%), or an organic material such as polyethylene terephthalate, polyester, ethylene trifluoride, or ethylene tetrafluoride filled in a heat-resisting vessel 19 for filling and solidifying the molten glass or organic material in the gap 18. After cooling or curing the liquid, the cores 16 are pulled out of the liquid 20 and any excess of the solidified glass or organic material is removed therefrom. The cores 16 are thus joined together with the spacer 15 of the predetermined thickness interposed therebetween to for a one body, which is then cut into several magnetic heads having a predetermined track width W as shown by chain lines, while portions at the both extremities including the distance pieces 15 are removed.

Vitreous material of a high fluidity, when used solely as a spacer, will infiltrate into the narrow gap very satisfactorily, but will have a low hardness and a coefficient of expansion different from that of the cores such as of ferrite, tending to chip off during use or grinding, or collapse. On the other hand, glass having a high hardness and the same coefficient of expansion as the cores such as of ferrite may advantageously be used as a spacer material in that no internal stress is developed between the cores even at an atmospheric temperature and it has a hardness suitable to the spacer. Such glass, however, generally has a poor fluidity and provides insufficient bond with the cores.

Figure 8A:
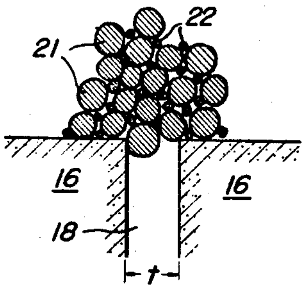
FIGS. 8A, 8B and 8C are explanatory views showing in succession in an enlarged scale the manner in which a glassy material for spacers infiltrates into a void gap by means of a capillary action.
Figure 8B:
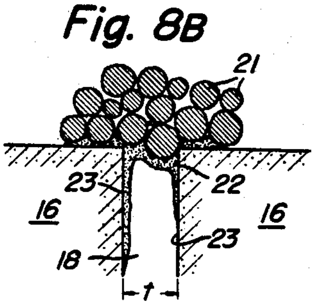
Figure 8C:
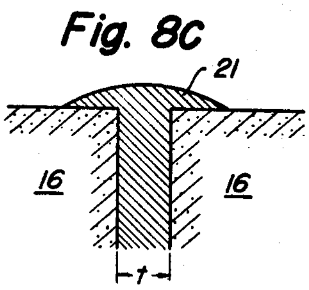

Such difficulties can be eliminated by the following method. FIGS. 8A, 8B and 8C show in an enlarged scale the opposing portions of the cores of the structure shown in FIG. 4. Although lumps of glassy material 14 have been used in FIG. 4, powder of glassy material is used in FIG. 8A. The glassy material of FIG. 8A comprises particles 21 of a vitreous material having a high melting point, a high hardness and the same coefficient of expansion as the cores 16, and particles 22 of a vitreous material having a low melting point, but an extremely high fluidity under a molten state, intermixed together at a suitable proportion. Then, when the cores 16 and the glass mixture are heated up to the melting point of the low melting glass 22, the highly fluid glass 22 flows through spaces between the high melting glass 21, thence infiltrates into the gap 18 between the cores 16 and uniformly wets all over the surfaces of opposing portions 23 of the cores 16 as shown in FIG. 8B. When, subsequently, the temperature is elevated up to the melting point of the high meltnig glass 21, the molten glass 21 flows over the portions that have been wetted by the low melting glass 22 and infiltrates into the narrow gap which has heretofore been difficult to be infiltrated. Thus, it is possible to constitute the magnetic gap as shown in FIG. 8C. The amount of the low melting glass 22 may be such that the opposing faces 23 of the cores 16 can only be uniformly covered by the glass 22 as shown in FIG. 8B. For example, glass, named BK–7, when used as the high melting vitreous material 21, will melt at a temperature of about 900° C., and has a coefficient of expansion very close to ferrite. For the low melting vitreous material 22, solder glass (of a composition PbO 80%, $B_2O_2$ 16% and ZnO 4%) may preferably be used, which melts at a temperature of 500° C. and has an extremely good permeability. When these two kinds of glass 21, 22 are mixed at a rate of seven to three by weight and the magnetic gap is formed by the just-described method, extremely excellent bond can be obtained between the ferrite cores 16 and the glass spacer 21. The magnetic head thus manufactured has been placed in practical use, but there has been utterly no fracture of the ferrite material in the neighborhood of the glass spacer.

Thus, it will be seen that, according to this embodiment, the spacer can be formed by mixing the vitreous material having a low melting point and a high fluidity with the hard vitreous material having a coefficient of expansion analogous to the cores and subsequently infiltrating the mixtures into the gap between the cores by means of a capillary action. In this method, full advantages of fluidity, hardness analogous to ferrite and coefficient of expansion of the two vitreous materials are taken of for infiltrating the vitreous materials into the narrow gap and providing firm bond with the cores to thereby provide magnetic heads having an extremely good characteristic.

Figure 9:
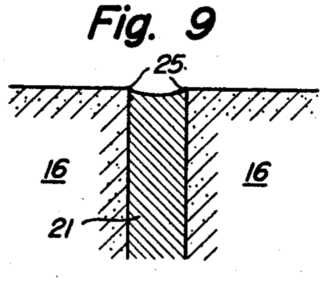
FIG. 9 is a partial sectional view of a magnetic gap with a spacer therein when an extremely hard material such a hot pressed ferrite is used as cores or rather soft non-magnetic material is used as a spacer.
Figure 10:
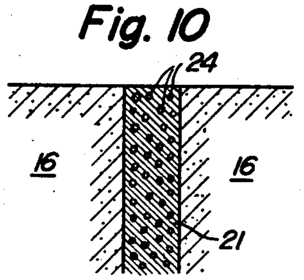
FIG. 10 is a view similar to FIG. 9, but showing particles of a hard non-magnetic material mixed into a glass spacer.

There may be some cases in which the cores are formed of an extremely hard material, and a glass spacer has a coefficient of expansion and a hardness both different from those of the cores even though such spacer is formed of two kinds of glass. In such case, a material having the same coefficient of expansion as the hard magnetic material of the cores must be selected first of all. However, in the magnetic head with such spacer material, the portion of the glass spacer 21 will be worn away quicker than other portions of the head as shown in FIG. 9, and edges 25 of the magnetic gap will be scraped off, resulting in degradation of the characteristis of the magnetic head. Dust of magnetic tapes may also accumulate in such concave portion. Such drawbacks can be eliminated by a method shown in FIG. 10. In FIG. 10, powder 24 of hard and non-magnetic material such as diamond is mixed into the glass spacer 21. This will increase the relative anti-abrasion property of the glass spacer 21 to an extent that it is as high as the anti-abrasion characteristic of the hard cores. According to a preferred embodiment, diamond powder of 0.25$\mu$ is mixed with solder glass (of a composition, PbO 80%, $B_2O_2$ 16% and ZnO 4%) at a rate of about one to five by weight, and the mixture is infiltrated into a magnetic gap of 2.5 $\mu$m. It is found that wear of glass at the magnetic gap is extremely little. Thus, it is possible to manufacture the magnetic head which can work at a high efficiency for an extended period of time.

Figure 11:
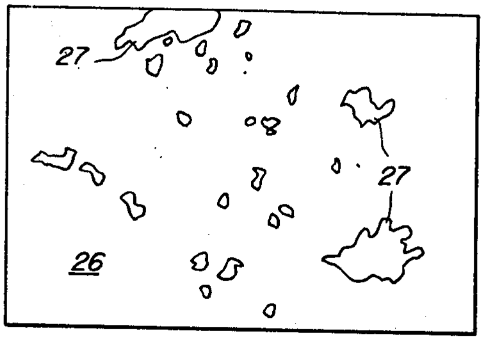
FIG. 11 is a microphotograph of a ferrite manufactured according to a conventional method as magnified one hundred and twenty times.

In the foregoing description with reference to the embodiments of the invention, the ferrite has been referred to as the material of hard cores. The ferrite comprises a multiplicity of varieties, of which most used is either $MnFe_2O_4$ or $NiFe_2O_4$. When the ferrite, as sintered, is polished to a mirror finish and looked at through a microscope, many pores or cavities 27 are observed in the structure of ferrite 26 as shown in FIG. 11. These pores, when incorporated into the magnetic gap, will appear as the cavities 12 of FIG. 2 and straightnes of the magnetic gap portion is thereby lost. For this reason, many researches have been made to improve the material of ferrite, and, among such researches, an effort has been made to make single crystals of ferrite. Such effort has mainly been directed to the manufacture of single crystals of $MnFe_2O_4$ in respect to the preference in the melting point. Although $NiFe_2O_4$ has a good characteristic at high temperatures and high frequency, the melting point thereof is extremely close to a platinum crucible. Therefore, the metal freed from the oxide immediately alloys with platinum to reduce the melting point thereof, resulting in liability of the platinum crucible to fracture, thus it is extremely difficult to manufacture $NiFe_2O_4$.

Single crystals are difficult to use since they have inherent magnetic anistropy and mechanical anistropy due to wear. The single crystals are also defective in that gliding is liable to take place at lattice planes resulting in collapse of the crystals due to dislocation of crystal faces. A great problem in the practical use of the single crystals also resides in an extremely high cost involved in the manufacture of large ones.

Figure 12:
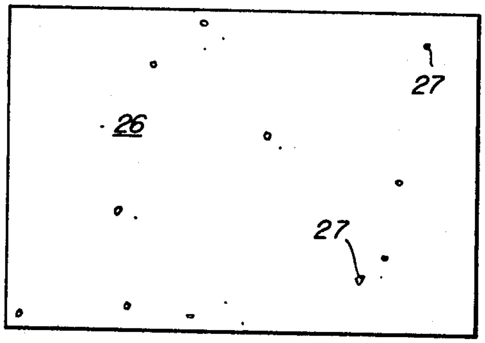
FIG. 12 is a view similar to FIG. 11, but showing a ferrite manufactured by hot-pressing.

Generally, in the structure of sintered bodies of the feririte in the form of sintered bodies of oxides, single crystals of one to several $\mu$m are combined with each other at boundaries of crystal grains which are assemblies of dislocations, and numerous bubbles formed in the course of mixing, moulding and sintering are naturally present at the boundaries of the crystal grains. Such sintered bodies of the ferrite are not only very poor in strength, but also are liable to be extremely worn when brought in frictional contact with other substances such as magnetic recording tape, to say nothing of wear by grinding material. Wear of crystals is caused by the gliding of a thickness layer at the crystal surface, but it has been known that, if there are dislocations in perpendicular relation with the gliding planes, the gliding in that direction can be kept from occurring. Materialization of this situation in the crystalline body can therefore be attained by providing a greater proportion of the boundaries of crystal grains, which are assemblies of disclocations, to the entirety of the sintered body. In other words, this can be attained by providing the sintered body composed of very fine crystal grains. Ferrite thus made is provided with an extremely small number of pores or cavities as shown in FIG. 12. In ordinary methods for manufacturing the ferrite, treatment at a temperature of more than at least 1100° C., generally at a temperature of about 1200° C. is required in order to provide a suitable strength. However, in sintering at such temperature, not only the sintering of ferrite grain merely takes place, but growth of the grains generally occurs. Thus, the proportion of boundaries of the crystal grains to the entire sintered body becomes smaller for the above-described reason, and the resultant sintered body will be very weak against wear.

According to the method of the invention, the ferrite is manufactured by compressing and moulding the ferrite grains under a high temperature and a high pressure, that is, by hot-pressing. The ferrite thus obtained is extremely effective for manufacturing the magnetic head therefrom wherein the ferrite is used to form at least the portion of magnetic circuit which abuts the recording medium and constitutes the magnetic gap.

An embodiment of hot-pressed ferrite is described hereinunder. Ferrite comprising, by molar percentage, NiO, 30, ZnO, 20 and $Fe_2O_3$, 50, is prepared in a usual manner and rendered as grains in the order of 1 $\mu$m also according to a usual practice. The ferrite is then placed in a mould of inside diameter 5 cm. and outside diameter 15 cm. made of alumina and silica, and electrically heated from outside by means of a silicon carbide heating element. At a temperature of about 750° C., the ferrite is compressed at a pressure of 50 kg./cm.$^2$ with a piston of the same material as the mould, and further quickly heated up to a temperature of about 1100° C., the pressure at this stage being increased to 100 kg./cm.$^2$, and held at this condition for about ten minutes. Then, the heating element is deenergized and the ferrite is allowed to cool to an atmospheric temperature.

Extent of wear tested on the crystalline body so formed is as follows. The ferrite thus hot pressed was cut into rod of a size, 3 mm. by 0.5 mm. by 30 mm. and made to abut at the face of 0.5 mm. by 3 mm. on a video tape moving at a rate of 20 m./sec. After five hours' operation, wear was checked and found out to be 20 $\mu$m. On the other hand, a similar wear test performed on a single crystal of same shape proved that wear amounted to 140 $\mu$m at plane 111, 80 $\mu$m at plane 110 and 60 $\mu$ at plane 100. Ferrite of the same composition as that in this embodiment was prepared by sintering for three hours at a temperature of 1350° C., and showed a wear of 160 m. after a similar test.

Thus, it will be understood that the magnetic head according to the invention is characterized in that the ferrite obtained by hot-pressing is used to form at least the portion of magnetic circuit abutting the recording medium and forming the magnetic gap, and the non-magnetic material held in a molten state by the above-described method is infiltrated into the magnetic gap to fill up the extremely narrow gap with said non-magnetic material. The cores so formed has a micro-Vickers hardness of about 1000 which is about one half to two times as high as the hardness of prior ferrite cores, and is free from brittleness or fragility frequently seen in single crystals. Further, any of ZiZn ferrite and MnZn ferrite can be equally manufactured, and this is desirable since better one for the purpose can be freely selected. Moreover, this kind of ferrite can be manufactured at a far lower cost than the single crystals of ferrite.

Figure 13:
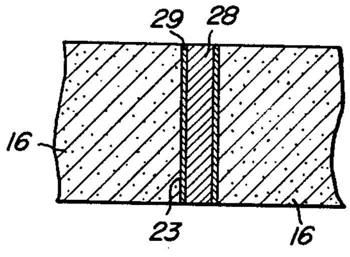
FIG. 13 is a partial top view through a head showing a magnetic gap in still another embodiment of the invention.

In the foregoing description, the invention has been described with particular reference to the magnetic heads having an extremely narrow magnetic head, but this invention may equally effectively be applicable to erasing heads having a magnetic gap in the order of 10 to 20 μm. Or more precisely, the erasing head comprises, as shown in FIG. 13, adhesive layers 29 of a vitreous material disposed on the opposing faces 23 of the hard cores 16 and a spacer 28 of glass or metal interposed between the adhesive layers 29 and firmly bonded thereto by means of heat treatment. Said adhesive layers comprise a vitreous material having a low surface tension and a high fluidity, such as glass mainly formed of silica or borax, borax glass added with silica ($SiO_2$), or borax glass added with vanadium pentoxide ($V_2O_5$) to give an improved permeability. When, generally, the spacer of sufficiently hard glass or metal and the ferrite cores are employed in the magnetic head, the spacer would not sufficiently bond to the ferrite even by heat treatment. However, by interposing therebetween adhesive layers 29 of a material of well bonding nature with the spacer and the ferrite, the spacer and the ferrite can be easily and firmly bonded together. When the spacer 28 of ordinary soda-lime glass is used, the bonding agent 29 of low melting glass such as glass rich in lead monoxide (PbO) or borax glass is preferred, and, when the spacer 28 is of a metallic material, glass rich in boric acid such as glass used as an underlayer for enamelling cast iron is preferred. It is possible to obtain a magnetic head having a predetermined gap width and a glass spacer free from deformation by the temperature, by employing a bonding agent 29 of glass such as solder glass having a softening temperature of 300 to 400° C. since ordinary soda-lime glass has a softening point of 700 to 900° C. In this case, said bonding agent in a molten state may effectively be infiltrated between the spacer 28 and the cores 16 of FIG. 13 by means of a capillary action, as in the case of FIG. 4.

It will be apparent to those skilled in the art that, although the foregoing description has been made with reference to the specific embodiments of the invention, changes and modifications may be made without departing from the spirit and scope of the invention.

What is claimed is:

1. A method for manufacturing a magnetic head comprising interposing a distance piece of a predetermined thickness equal to a desired gap of capillary dimensions at least at each of the opposite end portions between at least two magnetic cores having a length larger than a predetermined track width and consisting of a hard and brittle magnetic material so that the magnetic cores are opposed through said distance pieces and present an external coplanar surface interrupted by said gap, placing on said coplanar surface ond over the gap a mixture of two kinds of nonmagnetic, nonelectro-conductive materials of different physical characteristics with each other, said mixture comprising a hard glass material having a relatively higher melting point and a coefficient of thermal expansion analogous to said magnetic cores and another glass material having a relatively lower melting point and a high fluidity, said another glass material being in such an amount that the opposed surfaces defining said gap are at least uniformly covered with said another glass material when said another glass material is melted to be introduced into said gap, and heating the composite article including said cores at least to a temperature no lower than a melting point of said hard glass material so that said another glass material is first melted and introduced into said gap to wet substantially all over said opposed surfaces and subsequently said hard glass material is melted and infiltrated into said gap defined by said wetted opposed surfaces, said introduction and infiltration of materials being carried out under the effect of capillary action at said gap, thereby filling up said gap with said nonmagnetic, nonelectroconductive materials to provide a bond between said magnetic cores and said materials.

2. A method for manufacturing a magnetic head according to claim 1 in which said hard and brittle magnetic material is a ferrite made by hot pressing.

3. A method for manufacturing a magnetic head comprising interposing a distance piece of a predetermined thickness equal to a desired gap of capillary dimensions at least at each of the opposite end portions between at least two magnetic cores having a length larger than a predetermined track width and consisting of a very hard and brittle magnetic material so that the magnetic cores may be opposed through said distance pieces and present an external coplanar surface interrupted by said gap, placing on said coplanar surface and over the gap a mixture of two kinds of nonmagnetic, nonelectroconductive materials of different physical characteristics with each other, said mixture comprising a powdered glass material and a hard, nonmagnetic, nonelectroconductive material fine powder having a high melting point, and heating the composite article including said cores at least to a temperature no lower than a melting point of said glass material so that said mixture is melted and infiltrated into said gap under the effect of capillary action at said gap, thereby filling up said gap with said nonmagnetic nonelectroconductive materials to provide a bond between said very hard magnetic cores and said materials.

4. A method for manufacturing a magnetic head according to claim 3 in which said hard and brittle magnetic material is a ferrite made by hot pressing.

References Cited

UNITED STATES PATENTS

| | | | |
|---|---|---|---|
| 3,188,400 | 6/1965 | Vilensky | 179—100.2 |
| 3,283,396 | 11/1966 | Pfost | 29—603 |
| 3,004,325 | 10/1961 | Kornei | 170—100.2 X |
| 3,104,455 | 9/1963 | Frost | 29—603 |
| 3,145,453 | 8/1964 | Duinker et al. | 29—603 |
| 3,187,411 | 6/1965 | Duinker et al. | 29—603 |
| 2,883,566 | 4/1959 | Briggs | 310—217 X |
| 2,919,312 | 12/1959 | Rosenberger et al. | 179—100.2 |
| 2,949,376 | 8/1960 | Comas | 65—59 |
| 3,222,626 | 12/1965 | Feinberg et al. | 29—603 |
| 3,246,383 | 4/1966 | Peloskek et al. | 29—603 |
| 2,343,218 | 2/1944 | Lombard | 65—49 X |
| 2,500,748 | 3/1950 | Grant | 29—607 |
| 2,561,520 | 7/1951 | Lemmens et al. | 65—59 |
| 2,794,942 | 4/1957 | Cooper | 29—503 X |
| 2,431,540 | 11/1947 | Camras | 179—100.2 |

CHARLIE T. MOON, Primary Examiner

R. W. CHURCH, Assistant Examiner

U.S. Cl. X.R.

29—499, 502, 496; 65—58, 59, 36; 174—100.2; 340—174.1